E. HERMANN.
LOCKING PIN.
APPLICATION FILED DEC. 19, 1912. RENEWED JAN. 15, 1917.
1,237,515.  Patented Aug. 21, 1917.
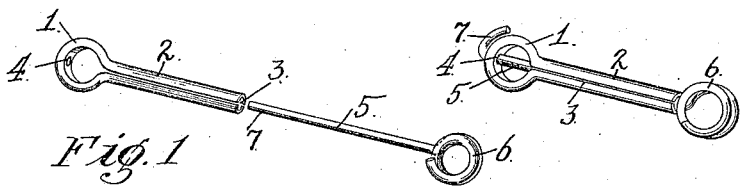
Fig. 1.  Fig. 2.
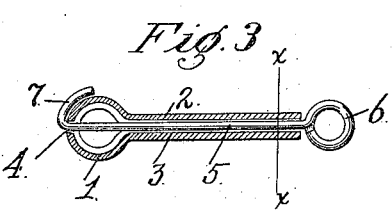
Fig. 3.
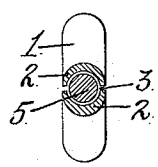
Fig. 4.
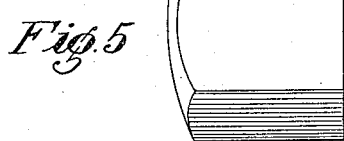
Fig. 5
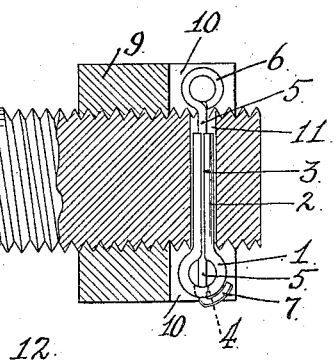
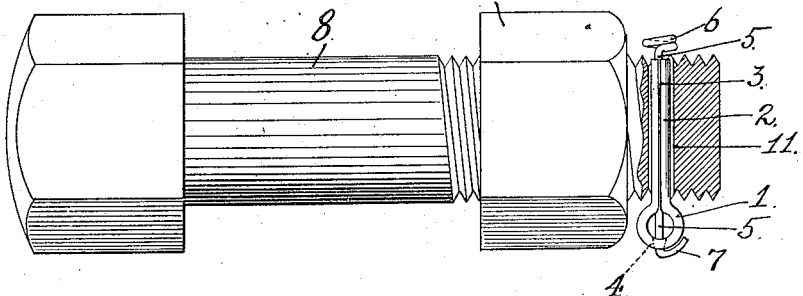
Fig. 6
WITNESSES:
W. A. Stock
S. Constine
INVENTOR
Emanuel Hermann
BY
Wm. F. Booth
ATTORNEY

UNITED STATES PATENT OFFICE.

EMANUEL HERMANN, OF SAN FRANCISCO, CALIFORNIA, ASSIGNOR OF ONE-HALF TO CLARENCE E. SCHMITT, OF SAN FRANCISCO, CALIFORNIA.

LOCKING-PIN.

1,237,515.      Specification of Letters Patent.      Patented Aug. 21, 1917.

Application filed December 19, 1912, Serial No. 737,624. Renewed January 15, 1917. Serial No. 142,556.

*To all whom it may concern:*

Be it known that I, EMANUEL HERMANN, a subject of the Emperor of Austria, residing at the city and county of San Francisco and State of California, have invented certain new and useful Improvements in Locking-Pins, of which the following is a specification.

My invention relates to the class of locking-pins, and may, in a sense, be regarded as allied to cotter-pins, in that in part, at least, it resembles such pins, and in use is intended to take their place.

The object of my invention is to provide a locking-pin capable of convenient application, secure in its position, easy to be removed, well adapted for use again, and of good appearance; and to this end my invention consists in the novel locking-pin which I shall now fully describe, by reference to the accompanying drawings, in which—

Figure 1 is a perspective view of my locking-pin, showing its members separated and about to be assembled.

Fig. 2 is a perspective view of the same, showing the members assembled.

Fig. 3 is a longitudinal section of the body member of the locking-pin, the locking member being shown in elevation.

Fig. 4 is an enlarged cross section on the line *x—x* of Fig. 3.

Fig. 5 is a view partly in elevation and partly in section showing the application of my locking-pin to a bolt fitted with a castellated nut.

Fig. 6 is a similar view showing the application of my pin to a bolt fitted with an ordinary nut.

The pin, as a whole, comprises a body member and a locking member. The body member is formed with a head 1 and a shank 2. Through the shank 2 is a longitudinal passage 3, and in the head 1 is a hole 4 which is in line with the passage 3. The locking member 5 has a head 6. To assemble these parts, the locking member 5 is slipped through the passage 3 of the shank 2 of the body member and through the hole 4 in the head 1 of said member, and the projecting end 7 of said locking member is bent down upon the outside of the body member head 1, all as shown in Figs. 2 and 3. The two members are thereby securely locked together.

In Fig. 5, a bolt 8 is fitted with a castellated nut 9, opposing slots 10 of which are alined with a cross hole 11 in said bolt. To fit the locking pin to this bolt and nut, the shank 2 of the body member is first passed into one of the slots 10 of the nut and into the hole 11 of the bolt, until the head 1 of said body member lies within said slot. Thereupon the locking member 5 which at this time is straight, as shown in Fig. 1, is passed into the opposing slot 10 of the nut and into the opposite end of the hole 11 in the bolt, and, entering the passage 3 of the shank 2 of the body member, is slipped through said passage and through the hole 4 in the head of the body member, until the head 6 of said locking member lies in its slot 10 of the bolt; and then the end 7 of said locking member is bent over flat down against the outer surface of the head.

In Fig. 6 the bolt 8 is fitted with an ordinary nut 12 and the locking pin engages the bolt beyond the nut. In this case, I have shown the body member of the locking pin as being a little longer than it is shown in Fig. 5, for in some cases the body member may terminate within the hole of the bolt, as in Fig. 5, or may pass through said hole, as in Fig. 6. Also in Fig. 6, in order to make the head 6 of the locking member lie close to the bolt, I have shown said head as being formed at right angles to the member, instead of parallel with said member, as in the other figures. In order to remove the locking pin, it is only necessary to snip off the bent end 7 of the locking member 5 or if desired to straighten it out, and then to seize the head 1 of the body member and withdraw said member, and then to withdraw the locking member. Both members are then fit for use again, the body member in all cases, it being unimpaired because it is not bent or mutilated; and the locking member may be reused if its end be carefully straightened out, but if not or if it be snipped off, then as said member is simply an ordinary piece of wire, a new member may be easily and quickly substituted.

The body member is best constructed along the general lines of a cotter-pin, that is, made from a single strip or piece, bent upon itself to form the loop-head and the separate parallel legs of the shank. But instead of said strip being of the usual solid half round section, such as the ordinary cotter-pins are made from, it is of concavo-convex section, as shown clearly in Fig. 4, thereby providing for the through passage 3; and said section may be one originally found in wire of this character, or may be made so by bending up flat wire. The hole 4 in the head 1 of the body member is made flaring from the outer surface to the inner, as is shown in Fig. 3, and indicated by dotted lines in Figs. 5 and 6, so that the inner end of the hole is of greater diameter and affords a better guide for the penetration of the locking member. This hole is best formed by punching from the inner side, preferably before bending the metal. Punching, in contradistinction to boring, is of advantage both in effecting the taper of the hole, and in tending to a reinforcement of the metal by a swaging effect, leaving all the metal there, instead of removing any of it.

The locking member is, as I have stated, an ordinary piece of wire readily fashioned and well adapted for renewal.

The body member not being subjected to any bending in the process of removal will, as stated, be unimpaired, and can be easily used again, unlike the ordinary cotter-pin, the bent ends of which when straightened out are left with an S curve, which renders the pin somewhat difficult of use again. In my locking pin there are no extensive and unsightly ends projecting as with the ordinary cotter-pins. It is easy to insert and to remove and is positive in its locking effect. The body member being relatively short, the legs of its shank lie closely and firmly in parallelism, thus making it easy to introduce. The locking member being of relatively small diameter is adapted more easily to find the hole in the body member so that great accuracy in the alinement of passages is not required.

I claim:—

1. A locking-pin comprising a body member made of a strip having a concavo-convex cross section, said strip being bent to form a head and a shank composed of parallel legs having concave faces opposing each other, to provide a passage through said shank, and said head having a hole through it in line with the passage through said shank; and a locking member made of a wire bent at one end to form a head, said wire passing through the shank of the body member and through a hole in the head of said member, and having its other end bent over on the exterior of the body member head.

2. A locking-pin comprising a body member made of a strip concavo-convex in cross section, doubled on itself to form a head and a shank composed of parallel legs having concave faces opposing each other, to provide a passage through said shank, and said head having formed in it a hole flaring from the exterior to the interior surface of the head, the hole being alined with the passage through said shank; and a locking member made of a wire bent at one end to form a head, said wire passing through the shank of the body member and through the hole in the head of said member, and having its other end bent over on the exterior of the body member head.

In testimony whereof I have signed my name to this specification in the presence of two subscribing witnesses.

EMANUEL HERMANN.

Witnesses:
WM. F. BOOTH,
S. CONSTINE.

Copies of this patent may be obtained for five cents each, by addressing the "Commissioner of Patents, Washington, D. C."